(12) United States Patent
Murakami

(10) Patent No.: US 7,714,953 B2
(45) Date of Patent: May 11, 2010

(54) DISPLAY DEVICE

(75) Inventor: Takashi Murakami, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 305 days.

(21) Appl. No.: 12/010,648

(22) Filed: Jan. 28, 2008

(65) Prior Publication Data

US 2009/0002928 A1 Jan. 1, 2009

(30) Foreign Application Priority Data

Jun. 27, 2007 (JP) ............... 2007-169580

(51) Int. Cl.
*G02F 1/1333* (2006.01)
(52) U.S. Cl. .................... 349/58; 349/60
(58) Field of Classification Search .......... 349/58, 349/60; 361/681
See application file for complete search history.

(56) References Cited

U.S. PATENT DOCUMENTS 5,659,376 A * 8/1997 Uehara et al. ............. 349/58
7,271,861 B2 * 9/2007 Yamazaki ................. 349/58
7,573,540 B2 * 8/2009 Katsuda et al. ........... 349/58

FOREIGN PATENT DOCUMENTS

JP 2006-039437 2/2006
WO WO 03/083362 A1 10/2003

* cited by examiner

*Primary Examiner*—Mike Qi
(74) *Attorney, Agent, or Firm*—Nixon & Vanderhye P.C.

(57) ABSTRACT

A display device has a laminated body including a first glass substrate and a second glass substrate, and an inside frame for supporting the laminated body. A polarizing plate is provided on a first surface as one main surface of the first glass substrate, and a part of a second surface as one main surface of the second glass substrate faces a third surface as the other surface of the first glass substrate via a liquid crystal member. And a driver for controlling the liquid crystal is provided at the non-face-to-face area of the end of the second surface where the second surface does not face the third surface. An inside frame has a fifth surface which faces a fourth surface as the other main surface of the second glass substrate via the polarizing plate, and is formed with a notch at the end of the fifth surface on the side of the non-face-to-face area.

8 Claims, 7 Drawing Sheets

(A)

(B)

DISPLAY DEVICE

CROSS REFERENCE OF RELATED APPLICATION

The disclosure of Japanese Patent Application No. 2007-169580 is incorporated herein by reference.

BACKGROUND OF THE INVENTION

1. Field of the Invention

The present invention relates to a display device. More specifically, the present invention relates to a display device having a laminated body including two sheets of glass substrates different in length and frames supporting them.

2. Description of the Related Art

An example of this kind of apparatus is disclosed in international publication WO2003/083362 (Patent Document 1). In the related art, by ensuring a space (clearance) between an inner wall of a frame and a laminated body, occurrence of a distortion due to the difference in thermal expansion properties is reduced.

Furthermore, another example is disclosed in Japanese Patent Application Laid-Open No. 2006-39437 (Patent Document 2). In the related art, an IC chip is provided at a difference area (non-laminated end being at one end of the glass substrate on which the other glass substrate is not laminated) of two glass substrates. Since the difference area is subject to an external force in a direction of thickness of the layer (the direction of lamination), in order to make a clearance between the IC chip and the frame smaller than a preset value, a portion facing the IC chip on the inner wall is protruded. Here, the preset value is limiting displacement amount when an external force is applied to the difference area to cause failure. Accordingly, even if an external force is applied to the difference area in the direction of the thickness of the layer, the displacement at the difference area is less than the preset value, and the possibility of failure of the difference area is thus reduced.

However, the related art of the Patent Document 2 is made on the basis of an assumption that the non-laminated end undergoes displacement to the side of the frame due to a drop, an impact, etc., but the frame is not deformed. In a case that a large external force is applied, or the frame is formed by a deformable material, a situation in which the end of the frame undergoes displacement to on the side of the non-laminated end occurs, in such the situation, it is difficult to avoid the damage. The reason why is that the decrease in clearance contrarily causes a contact the end of the frame with the non-laminated end with ease.

On the other hand, in the related art of the Patent Document 1, a clearance capable of absorbing the displacement of the end of the frame to the non-laminated end side is set, but the thickness is on the order of the thickness of the polarizing plate at most, and cannot handle displacement larger than this.

SUMMARY OF THE INVENTION

Therefore, it is a primary object of the present invention to provide a novel display device.

Another object of the present invention is to provide a display device capable of reducing a possibility of a non-laminated end of being damaged by an external force in a direction of lamination.

The present invention employs following features in order to solve the above-described problems. It should be noted that reference numerals inside the parentheses and supplement show one example of a corresponding relationship with the embodiments described later for easy understanding of the present invention, and do not limit the present invention.

A display device according to a first invention comprises a first glass substrate, a second glass substrate and a first supporting member. The second glass substrate has a first surface as one main surface a part of which faces a second surface as one main surface of the first glass substrate. The first supporting member has a fourth surface facing a third surface as other main surface of the second glass substrate. A distance between the third surface and the fourth surface is relatively increased at a non-face-to-face area side where the first surface does not face the second surface in comparison with at a face-to-face area side where the first surface faces the second surface.

In a display device (10) according to the first invention, a second glass substrate (16) has a first surface (S2) as one main surface a part of which faces a second surface (S3) as one main surface of the first glass substrate, and a first supporting member (28) has a fourth surface (S5) facing a third surface (S4) as other main surface of the second glass substrate. And, a distance between the third surface and the fourth surface is relatively increased at a non-face-to-face area side where the first surface does not face the second surface in comparison with at a face-to-face area side where the first surface faces the second surface.

According to the first invention, since the distance between the third surface and the fourth surface, that is, a clearance (G3) formed between the bottom surface of the laminated body including the first glass substrate and the second glass substrate and the supporting surface for supporting them is widened (that is, the thickness of the clearance is increased) at the end on the non-face-to-face area side (that is, non-laminated end at the end of the second glass substrate on which the first glass substrate is not laminated) in the direction of lamination, it is possible to reduce the possibility of the non-laminated end being damaged by an external force in the direction of lamination.

A display device according to a second invention is dependent on the first invention, and a first concave portion is formed at an end of the fourth surface on the non-face-to-face area side.

In the second invention, by forming a first concave portion (N1) at the end of the fourth surface on the non-face-to-face area side, the distance between the third surface and the fourth surface is relatively increased at the non-face-to-face area side in comparison with at the face-to-face area side.

A display device according to a third invention is dependent on the second invention, and further includes a second supporting member. The first supporting member further includes a fifth surface having a front and rear relationship with the fourth surface, and the second supporting member has a sixth surface facing the fifth surface. The distance between the fifth surface and the sixth surface is relatively increased at the non-face-to-face area side in comparison with at the face-to-face area side.

In the third invention, the first supporting member further includes a fifth surface (S6) having a front and rear relationship with the fourth surface, and the second supporting member (30) has a sixth surface (S7) facing the fifth surface. Then, the distance between the fifth surface and the sixth surface is relatively increased at the non-face-to-face area side in comparison with at the face-to-face area side.

According to the third invention, since the distance between the fifth surface and the sixth surface, that is, the clearance (G2) between the first supporting member and the second supporting member is increased at the non-face-toface area side, and therefore, it is possible to further reduce the possibility of the damage together with the clearance (G3) between the third surface and the fourth surface.

A display device according to a fourth invention is dependent on the third invention, and a second concave portion is formed at an end of the fifth surface on the non-face-to-face area side.

In the fourth invention, by providing the second concave portion (N2) at the end of the fifth surface on the non-face-to-face area side, the distance between the fifth surface and the sixth surface is relatively increased at the non-face-to-face area side in comparison side with at the face-to-face area side.

A display device according to a fifth invention is dependent on any one of the third or the fourth invention, and a third concave portion is formed at an end of the sixth surface on the non-face-to-face area side.

In the fifth invention, by providing a third concave portion (N3) at the end of the sixth surface on the non-face-to-face area side, the distance between the fifth surface and the sixth surface is relatively increased (further increased) at the non-face-to-face area side in comparison with at face-to-face area side.

The display device according to the sixth invention comprises a first glass substrate, a second glass substrate, a first supporting member and a second supporting member. The second glass substrate has a first surface as one main surface a part of which faces a second surface as one main surface of the first glass substrate. The first supporting member has a fourth surface facing a third surface as other main surface of the second glass substrate and having a fifth surface having a front and rear relationship with the fourth surface. The second supporting member has a sixth surface facing the fifth surface. The distance between the fifth surface and the sixth surface is relatively increased at a non-face-to-face area side where the first surface does not face the second surface in comparison with at a face-to-face area side where the first surface is faces the second surface.

In a display device (10) according to the sixth invention, a part of a first surface (S2) as one main surface of a second glass substrate (16) faces a second surface (S3) as one main surface of the first glass substrate, and a first supporting member (28) has a fourth surface (S5) facing a third surface (S4) as other main surface of the second glass substrate and has a fifth surface (S6) having a front and rear relationship with the fourth surface. A second supporting member (30) has a sixth surface (S7) facing the fifth surface. And, a distance between the fifth surface and the sixth surface is relatively increased at a non-face-to-face area side where the first surface does not face the second surface in comparison with at a face-to-face area side where the first surface faces the second surface.

According to the sixth invention, the distance between the fifth surface and the sixth surface, that is, the clearance (G2) formed between the first supporting member and the second supporting member is widened (that is, the thickness of the clearance is increased) in a direction of lamination at the non-face-to-face area side (a non-laminated end being at the end of the second glass substrate on which the first glass substrate is not laminated). Here, the fifth surface is a surface having a front and rear relationship with fourth surface (that is, supporting surface supporting the bottom surface of the laminated body including the first glass substrate and the second glass substrate) facing the third surface. As a result, it is possible to reduce the possibility of the non-laminated end being damaged by an external force in the direction of lamination.

A display device according to a seventh invention is dependent on the sixth invention, and a first concave portion is formed at the end of the fifth surface on the non-face-to-face area side.

In the seventh invention, by forming the first concave portion (N2) at the end of the fifth surface on the non-face-to-face area side, the distance between the fifth surface and the sixth surface is relatively increased at the non-face-to-face area side in comparison with at the face-to-face area side.

A display device according to an eighth invention is dependent on one of the sixth or the seventh invention, and a second concave portion is formed at an end of the sixth surface on the non-face-to-face area.

In the eighth invention, by forming a second concave portion (N3) at the end of the sixth surface on the non-face-to-face area side, the distance between the fifth surface and the sixth surface is relatively increased (further widened) at the non-face-to-face area side in comparison with at the face-to-face area side.

According to the present invention, it is possible to reduce the probability of the non-laminated end being damaged by an external force in the direction of lamination.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
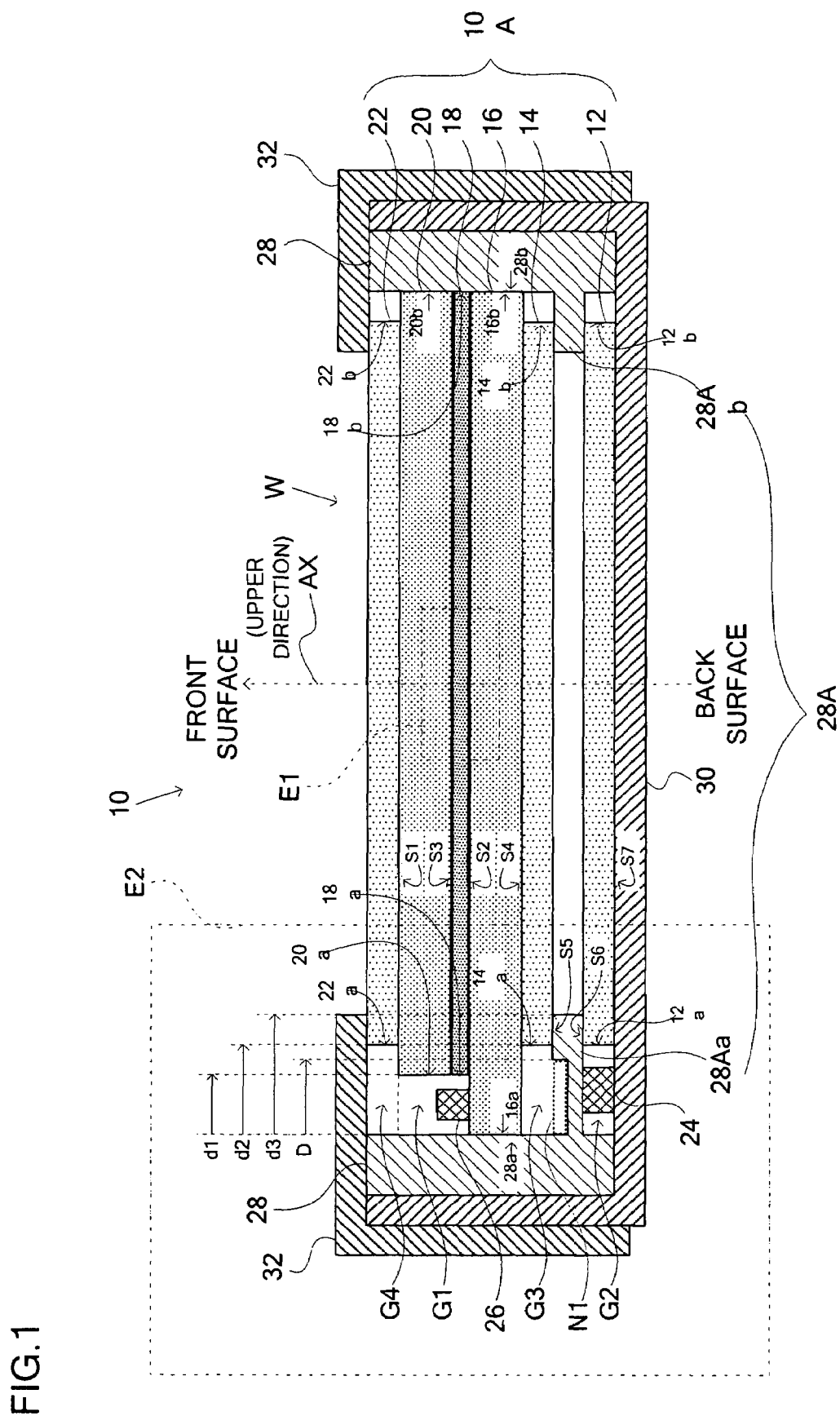
FIG. 1 is a cross-sectional view showing one embodiment of the present invention.

Referring to FIG. 1, a liquid crystal display device 10 of this embodiment is applied to a portable game machine, a cellular phone terminal, etc., and has a light guide plate with backlighting 12, a polarizing plate on the back surface side 14, a glass substrate on the back surface side 16, a liquid crystal member 18, a glass substrate on the front surface side 20, a polarizing plate on the front surface side 22, an LED 24, a driver (IC chip) 26, an inside frame 28, a back surface frame 30 and a front surface frame 32.

The light guide plate with backlighting 12, the polarizing plate 14 and the polarizing plate 22 are formed in a rectangular plate, and have main surfaces of the same size. The glass substrate 20 is formed in a rectangular plate, and has a size slightly larger than that of the main surface of the light guide plate with backlighting 12, the polarizing plate 14 or the polarizing plate 22. The glass substrate 16 is formed in a rectangular plate, and has a size substantially (=d1) larger than that of the main surface of the glass substrate 20. Additionally, each of the polarizing plates 14 and 22 has a thickness of the order of 0.2 mm, and each of the glass substrates 16 and 20 has a thickness of the order of 0.5 mm.

Figure 2:
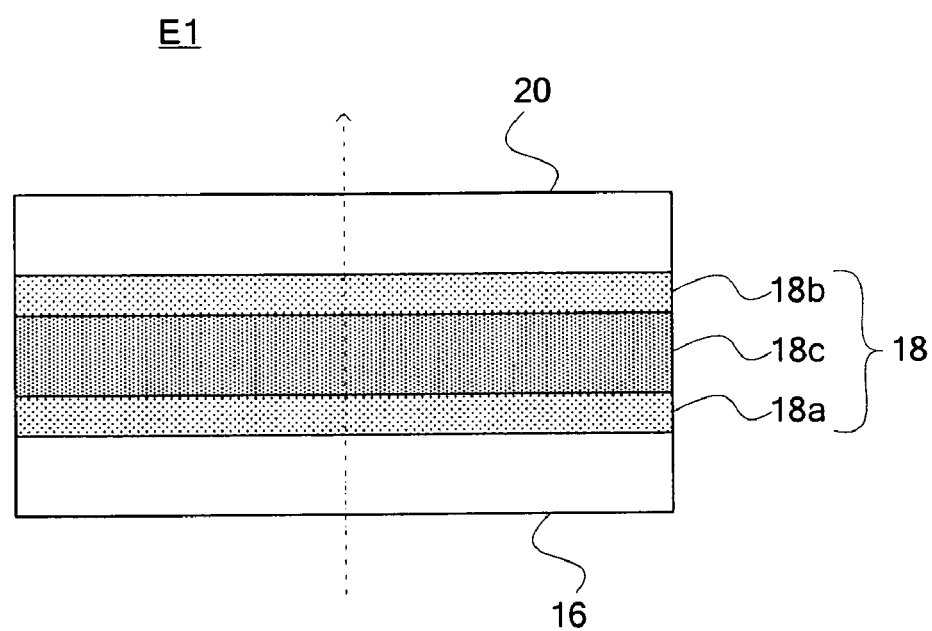
FIG. 2 is a cross-sectional view showing a liquid crystal member applied to FIG. 1 embodiment.

The liquid crystal member 18 is formed in a rectangular plate, and has the same size as the glass substrate 20. An example of the configuration of the liquid crystal member 18 is shown in FIG. 2. Referring to FIG. 2, the liquid crystal member 18 includes a thin-film transistor (TFT) layer 18a provided on a top surface of the glass substrate 16, a color filter (CF) layer 18b provided on a bottom surface of the glass substrate 20, and a liquid crystal layer 18c provided between the TFT layer 18a and the CF layer 18b. Here, the liquid crystal layer 18c has structure in which a liquid crystal member is sandwiched by a pair of transparent electrodes.

The light guide plate with backlighting 12, the polarizing plate 14, the glass substrate 16, the liquid crystal member 18, the glass substrate 20 and the polarizing plate 22 are laminated in a direction of an optical axis AX such that the center of each of the main surface is coincident with the optical axis AX. In this embodiment, the optical axis AX direction is called a "direction of lamination" or a "direction of thickness of the layer". Furthermore, with respect to the direction of lamination, a direction from the back surface to the front surface is defined as an upper direction, and the right and left directions are defined by taking the direction as a reference.

An inside frame 28 is formed in a rectangular frame, and encloses a surface of a laminated body 10A being made up of the light guide plate with backlighting 12 and the polarizing plate 22. More specifically, the inside frame 28 has an inside diameter slightly larger than the main surface of the glass substrate 16. Thus, a left end surface 16a of the glass substrate 16 is in contact or closely in contact with a left inner surface 28a of the inside frame 28, and a right end surface 16b of the glass substrate 16 is in contact or closely in contact with a right inner surface 28b of the inside frame 28.

The glass substrate 20 is placed such that a right end surface 20b thereof is in contact with the right inner surface 28b of the inside frame 28. The liquid crystal member 18 is also placed such that a right end surface 18b thereof is in contact with the right inner surface 28b of the inside frame 28. As a result, a clearance G1 corresponding to dimensional differences (=d1) between the glass substrate 16 and the glass substrate 20 occurs between the left end surface 20a and 18a and the left inner surface 28a. A driver 26 is placed within the clearance G1.

Each of light guide plate with backlighting 12, the polarizing plate 14 and the polarizing plate 22 are placed such that a clearance G2 to G4 of d2 (>d1) long occurs between each of left end surfaces 12a, 14a and 22a and the left inner surface 28a of the inside frame 28. An LED 24 is placed in the clearance G2 at the left of the light guide plate with backlighting 12.

The inside frame 28 is formed with a rib 28A to be inserted between the light guide plate with backlighting 12 and the polarizing plate 14 on the inner surface. The rib 28A also has a frame shape, and the length (length of the frame) is d3 (>d2) on the side of the left inner surface 28a, and is shorter than d3 (has the same length as d1, for example) on the side of the right inner surface 28b. Accordingly, the space between the light guide plate with backlighting 12 and the polarizing plate 14 is a hollow-body except for the right and left ends.

Then, the portion of the rib 28A on the side of the left inner surface 26a (left rib 28Aa) is formed with a notch (N1) starting from the left inner surface 28a having a length of D (0<D<d3: It is preferable that d1<D<d2) on a surface (S5) which is brought into contact with the polarizing plate 14. The notch N1 has a thickness one third or half the left rib 28Aa, for example.

By such a notch N1, a space between the top surface S5 of the left rib 28Aa and a bottom surface S4 of the glass substrate 16 is increased on the left end side, that is, the thickness of the clearance G3 on the left end side is increased by the thickness of the notch N1.

The back surface frame 30 is a rectangular parallelepiped cover that covers the back surface of the light guide plate with backlighting 12 and an outer surface of the inside frame 28. The front surface frame 32 is a rectangular parallelepiped cover that covers a periphery of a front surface of the polarizing plate 22 and a side surface of the back surface frame 30, and is formed with a window W the same size as a display screen on a main surface. The laminated body 10A whose side surface is enclosed by the inside frame 28 is sealed by such a back surface frame 30 and a front surface frame 32.

It should be noted that with respect to materials of the frames, the inside frame 28 is made of plastic, and each of the back surface frame 30 and the front surface frame 32 is made of metal such as aluminum, etc.

In the liquid crystal display 10 structured as described above, light from the LED 24 goes from a left end surface 12a of the light guide plate with backlighting 12 to the entire back surface of the laminated body 10A while a video signal input from an outside is applied to the driver 26. The driver 26 drives the liquid crystal member 18 by the applied video signal to control quantity of transmitted light of the laminated body 10A on a pixel-by-pixel basis. As a result, a color image corresponding to the video signal is output from the front surface (window W) of the laminated body 10A.

Here, when a large external force is applied to the liquid crystal display 10 due to a drop, a collision, etc., the back surface frame 30 is deformed to damage the laminated body 10A inside thereof. Especially, readily damaged is the left end of the glass substrate 16, that is, the non-laminated end where the glass substrate 20 is not laminated.

Figure 3:
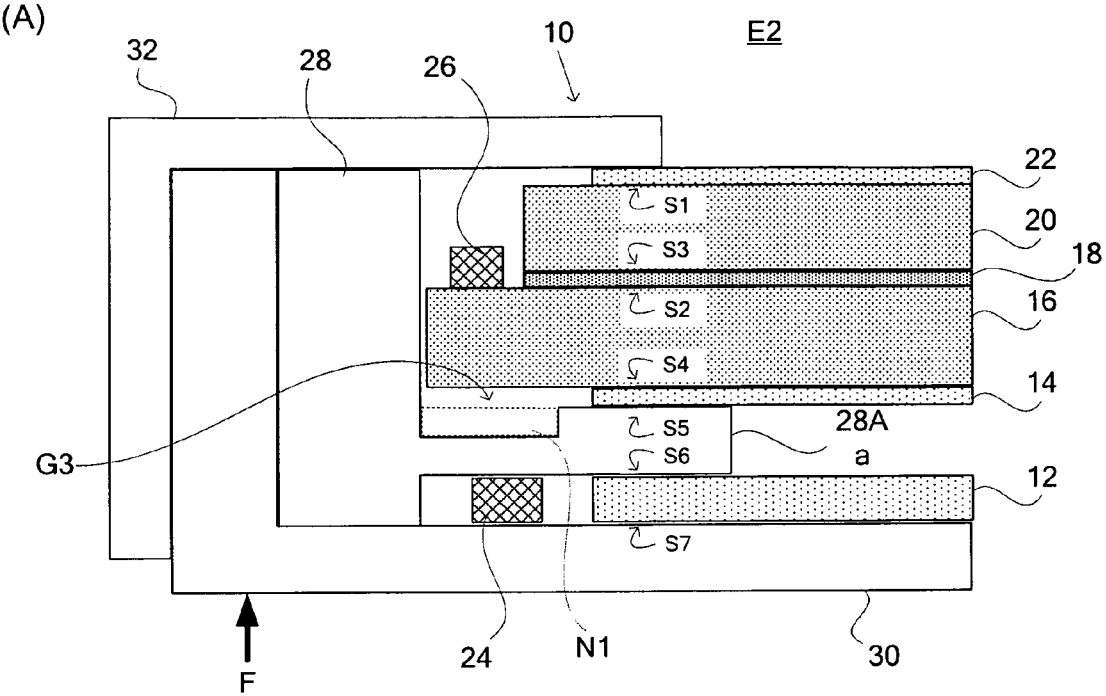
FIG. 3(A) is a grossly enlarged sectional view of a left end of FIG. 1 embodiment.
FIG. 3(B) is a cross-sectional view showing a state in which the left end is deformed by an external force.
Figure 3:
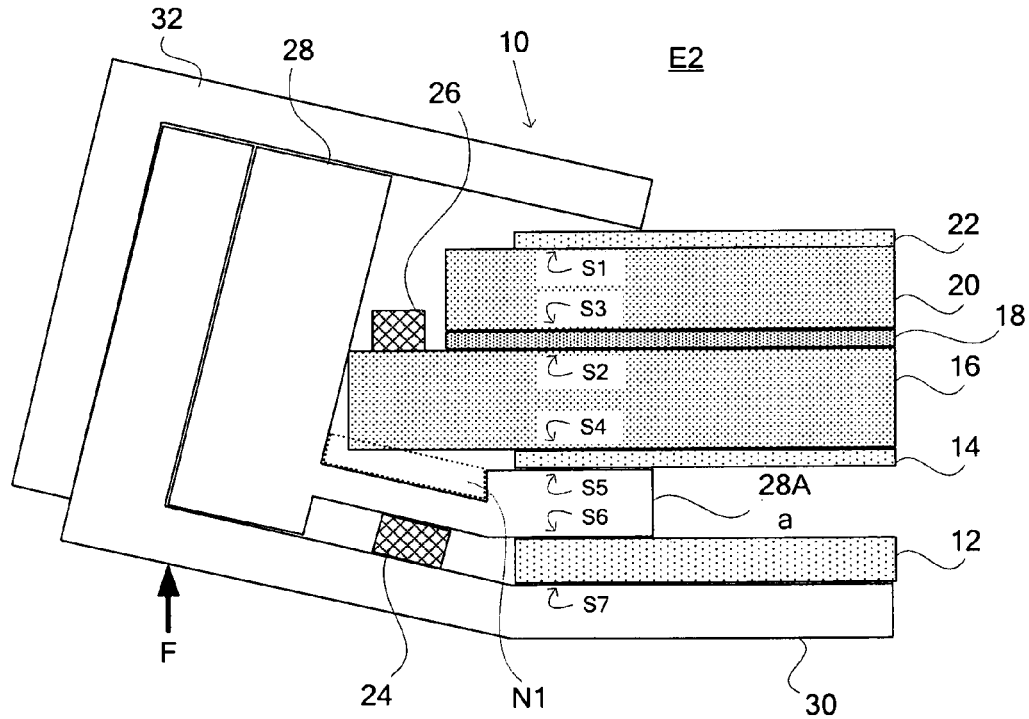

More specifically, as shown in FIG. 3(A), when an upward external force F is applied to the left end of the back surface frame 30, the back surface frame 30 and inside frame 28 are folded upward around the left end surface 12a of the light guide plate with the backlighting 12 as shown in FIG. 3(B). As a result, the top surface S5 of the left rib 28Aa is in contact with the left end (non-laminated end) of the glass substrate 16 and may damage the same.

However, by forming the notch N1 on the top surface S5 of the left rib 28Aa, the top surface S5 of the left rib 28Aa is away from the bottom surface S4 of the glass substrate 16 by the thickness of the notch N1. That is, since the thickness of the clearance G3 is increased by the thickness of the notch N1, the possibility of the damage is reduced. It should be noted that the preferable thickness of the notch N1 is decided in view of prevention of the damage of the glass substrate 16 as described above and strength of the left rib 28Aa itself, etc.

As understood from the above description, in the liquid crystal display 10 of this embodiment, the polarizing plate on the front surface side 22 (first polarizing plate) is provided on the surface S1 (first surface) being a top surface (one main surface) of the glass substrate on the front surface side 20

(first glass substrate). A part of the surface S2 (second surface) being the top surface (one main surface) of the glass substrate on the back surface side 16 (second glass substrate) faces the surface S3 (third surface) being the bottom surface (the other main surface) of the glass substrate 20 via the liquid crystal member 18, and the driver 26 (circuit component) for controlling the liquid crystal member 18 is provided at a non-face-to-face area being the end of the top surface S2 which does not faces the lower surface S3. Here, an area of the top surface S2 which faces the bottom surface S3 is called a "face-to-face area".

The inside frame 28 (first supporting member) has the surface S5 (fifth surface) facing the surface S4 (fourth surface) being a top surface (other main surface) of the glass substrate 16 via the polarizing plate on the back surface side 14 (second polarizing plate), and the notch N1 (first concave portion) is formed at the end of the surface S5 on the non-face-to-face area side.

According to this embodiment, the notch N1 is formed at the end of the surface S5 (that is, supporting surface supporting the laminated body 10A including the glass substrates 20 and 16) facing the surface S4 on the non-face-to-face area side (that is, non-laminated end that being the end of the glass substrate 16 on which the glass substrate 20 is not laminated). As a result, since the distance between the surface S4 and the surface S5 is increased on the side of the non-laminated end in a direction of lamination (the direction of thickness of the layer) (that is, the thickness of the clearance G3 between the surface S4 and the surface S5 is increased), it is possible to reduce possibility of the non-laminated end being damaged by an external force in the direction of lamination.

Figure 4:
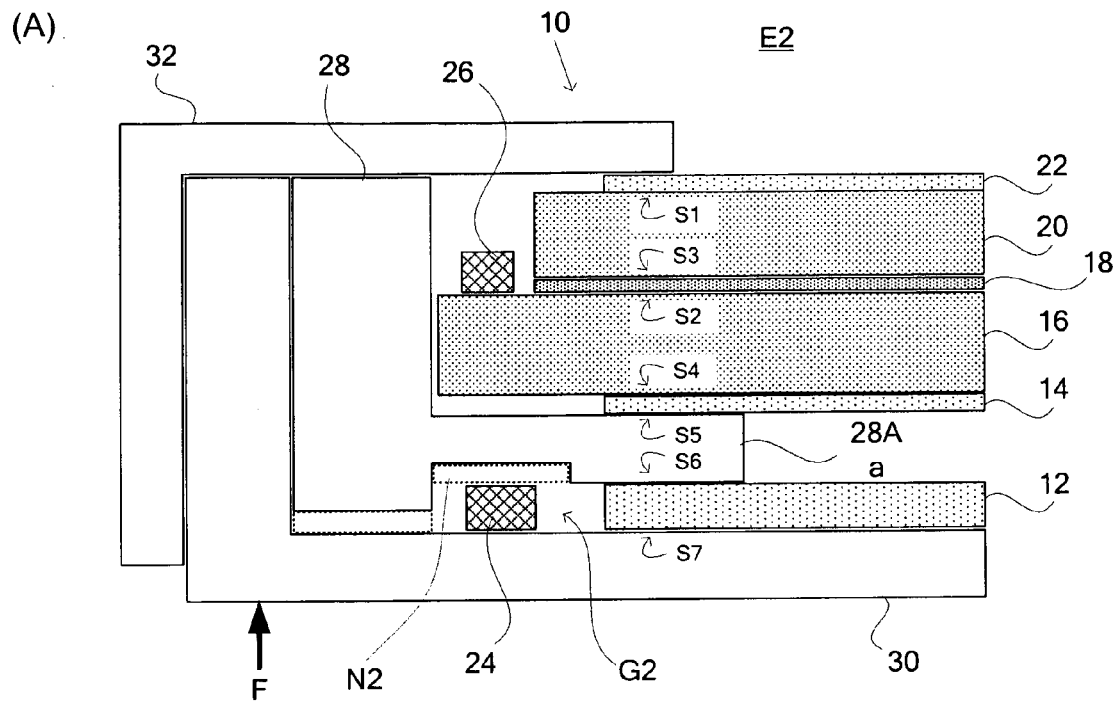
FIG. 4(A) is a grossly enlarged sectional view showing a left end of another embodiment.
FIG. 4(B) is a cross-sectional view showing a state in which the left end is deformed by an external force.
Figure 4:
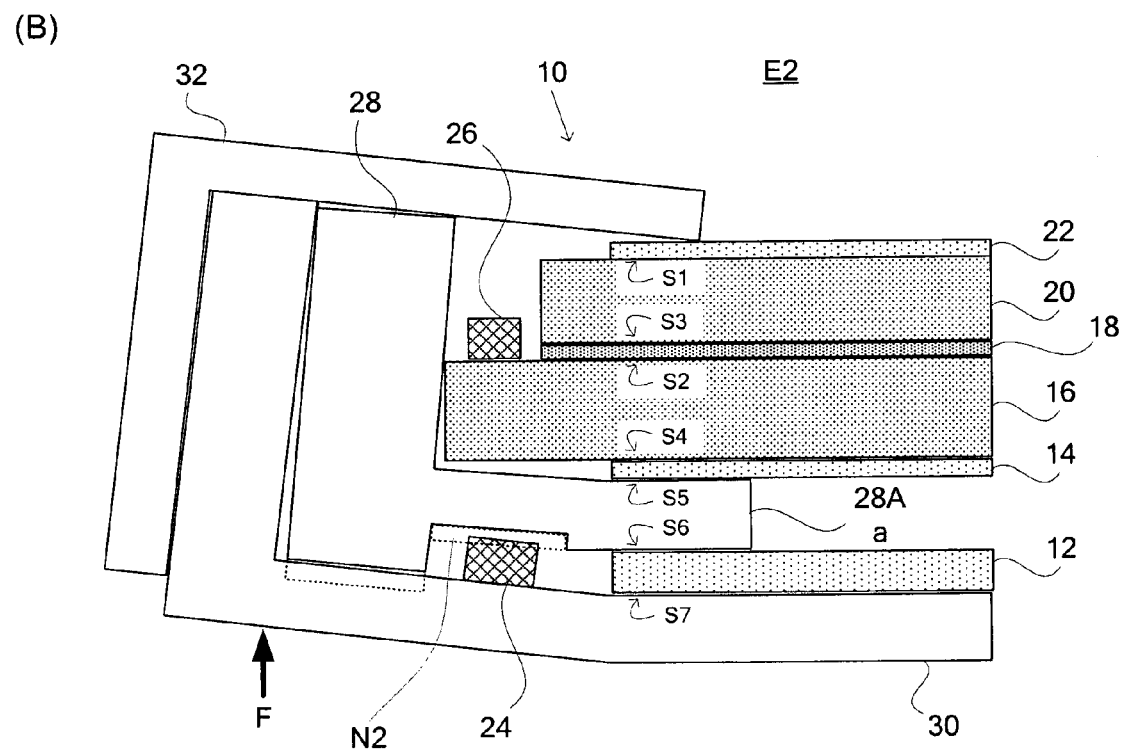

It should be noted that in this embodiment, the notch N1 is provided at the top surface S5 of the left rib 28Aa formed on the inside frame 28, but alternatively, a notch N2 may be provided at the left end (end of the non-laminated end) of the bottom surface S6 of the inside frame 28. One example is shown in FIG. 4(A). In this case also, when an upward external force F is applied to the left end of the back surface frame 30, the back surface frame 30 and the inside frame 28 are upward folded as shown in FIG. 4(B). However, since the bottom surface S6 is away from the top surface S7 of the back surface frame 30 by the thickness of the notch N2, that is, the thickness of the clearance G2 is increased by the thickness of the notch N2, it is possible to reduce the possibility of the damage.

Figure 5:
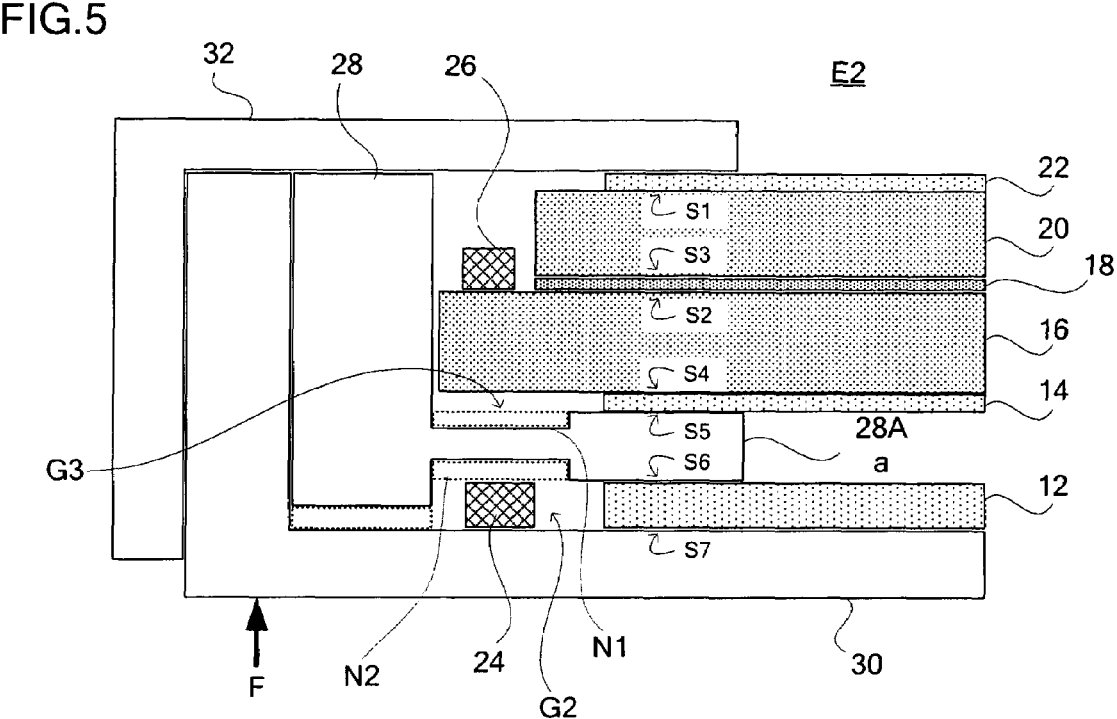
FIG. 5 is a grossly enlarged sectional view showing a left end of a still another embodiment.

Alternatively, a notch N1 and a notch N2 are provided at the top surface S5 and the lower surface S6, respectively (see FIG. 5). In this case, since a total thickness of clearances G3 and G2 is increased by a total thickness of the notches N1 and N2 on the left end side, it is possible to more reduce the possibility of the damage.

Figure 6:
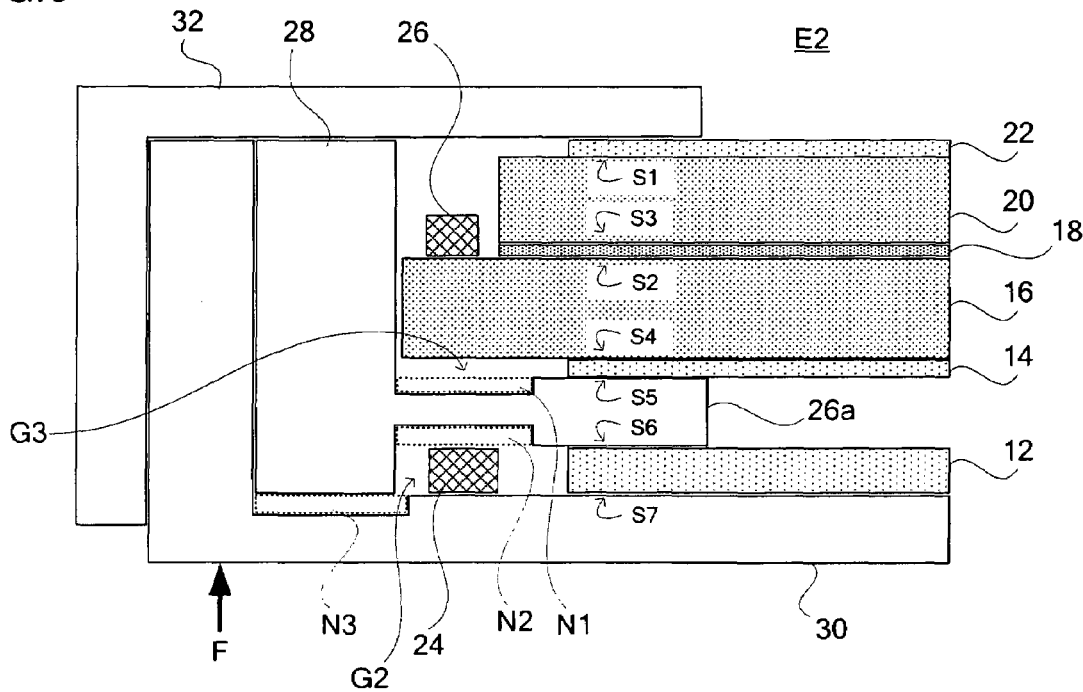
FIG. 6 is a grossly enlarged sectional view showing a left end of a yet another embodiment.

In addition, as shown in FIG. 6, by providing a notch N3 at the left end of the top surface S7 of the back surface frame 30 other than the notch N1 and the notch N2, it is possible to further reduce the possibility of the damage. In a case that the notch N3 is singly used or used with any one of the notch N1 and the notch N2, it is possible to obtain some degree of effect of reducing the damage in both cases.

Figure 7:
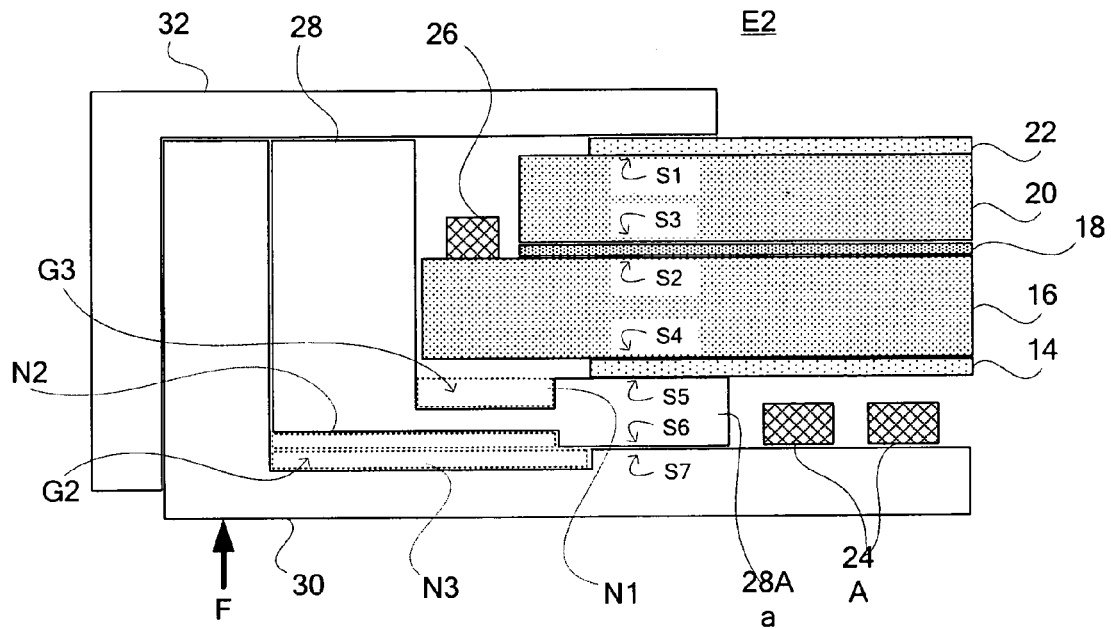
FIG. 7 is a grossly enlarged sectional view showing a left end of a further embodiment.

It should be noted that the liquid crystal display 10 described above is an edge light type, but the invention can be applied to a system except for it such as a direct light type liquid crystal display, for example. Such an embodiment is shown in FIG. 7. The liquid crystal display 10 shown in FIG. 7 is provided with an LED array 24A arranged directly below the polarizing plate 14 in place of the LED 24 and the light guide plate with backlighting 12 shown in FIG. 1. Accordingly, a bottom surface S6 of the left rib 28Aa directly faces a top surface S7 of the back surface frame 30.

In this case also, a notch N1 is formed at the left end of the top surface S5 of the left rib 28Aa, a notch N2 is formed at the left end of the bottom surface S6 of the inside frame 28, and a notch N3 is formed at the left end of the top surface S7 of the back surface frame 30, and whereby, it is possible to effectively reduce the possibility of damage.

In general, by providing at least any one of the notches N1, N2 and N3 as described above, the thickness of the clearance G3 and/or G2 positioned below (side to which an external force F is applied) the left end (end on the non-laminated end side) of the laminated body 10A is increased, and it is possible to obtain reduction effect on the basis of an increase.

Figure 8:
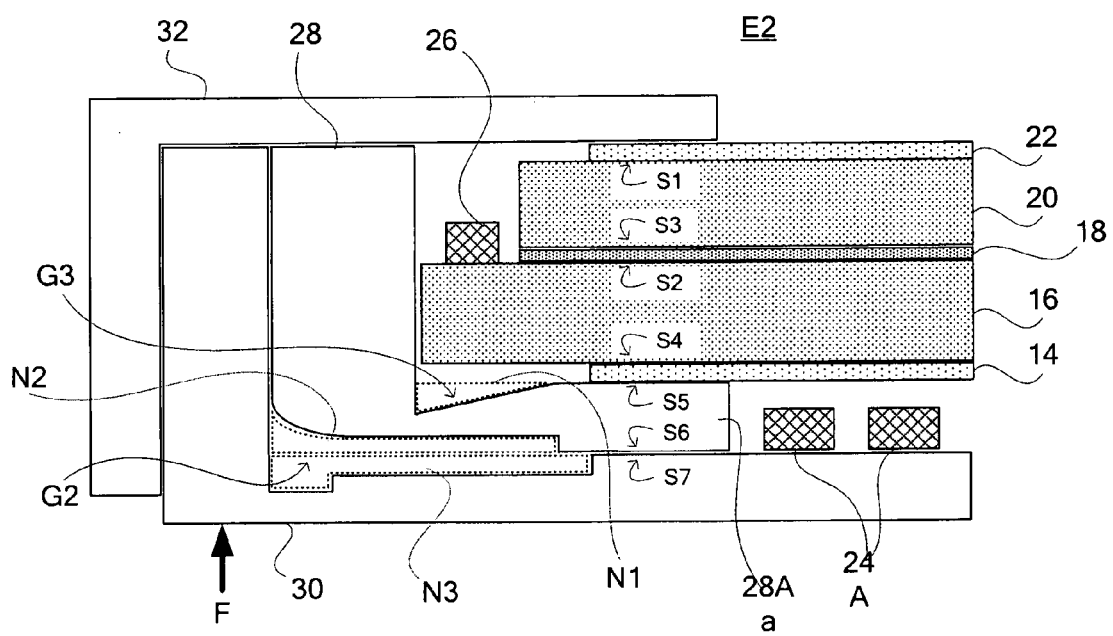
FIG. 8 is a grossly enlarged sectional view showing a left end of a further another embodiment.

It should be noted that the shape of each the notch N1, N2 and N3 is rectangular in FIG. 1-FIG. 7, but takes an arbitrary shape like a wedge. In a case that the notch takes shape except for a rectangle, in view of prevention of the contact, the surfaces S5-S7 are provided with inclinations or steps such that the thickness of the notch is increased toward the side of the non-laminated end. Such an example is shown in FIG. 8.

Furthermore, the present invention can be applied to a reflection type liquid crystal display, and in this case, there is not need of preparing a polarizing plate on the back surface side 14. Additionally, a liquid crystal display such as a polymer dispersion type, etc. without the need of two sheets of polarizing plates 14 and 22 has been developed, but the present invention can be applied to this.

In addition, by printing wiring of an electronic circuit for driving a liquid crystal on the glass substrate 16, that is, changing a part of the glass substrate 16 into a printed board integration, it is possible to omit the circuit component 26.

Figure 9:
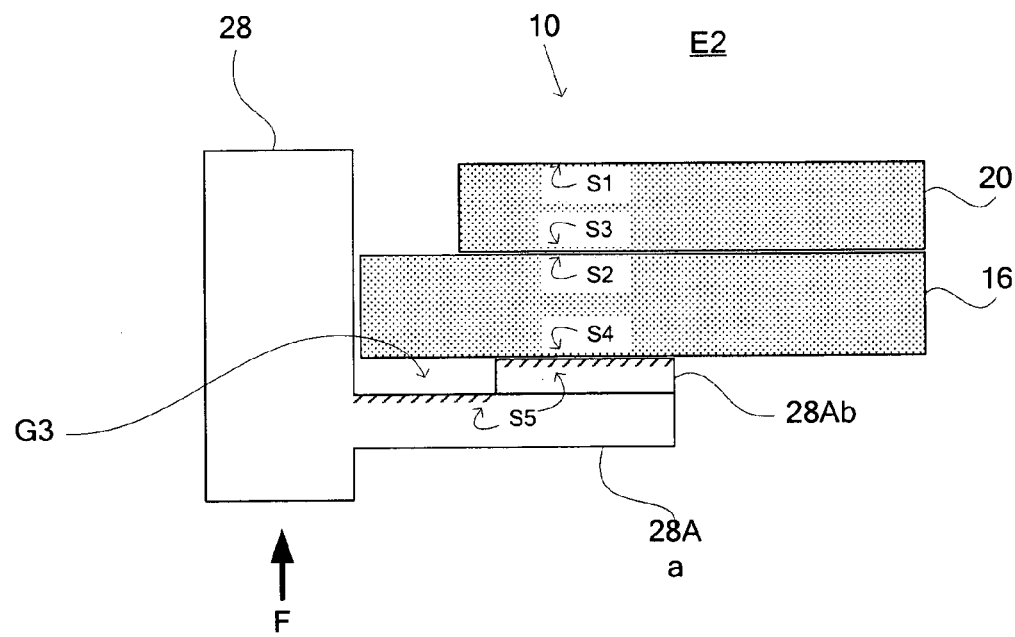
FIG. 9 is a grossly enlarged sectional view showing a left end of another embodiment.

It should be noted that by providing a notch to the supporting member such as the inside frame 28, a clearance is ensured in the above description, but by providing a protrusion to the supporting member also, it is possible to ensure a clearance. Such an example is shown in FIG. 9. Referring to FIG. 9, a protrusion 28Ab is a separate body from the inside frame 28, and provided away from the left end of the glass substrate 16 toward the right side by the distance corresponding to the above-described notch N1. Alternatively, the protrusion 28Ab may be integrated with the inside frame 28.

Thus, by providing a notch and/or protrusion to the supporting member, the thickness of the supporting member is decreased at the non-face-to-face area side in comparison with the face-to-face area side to thereby ensure a clearance.

Figure 10:
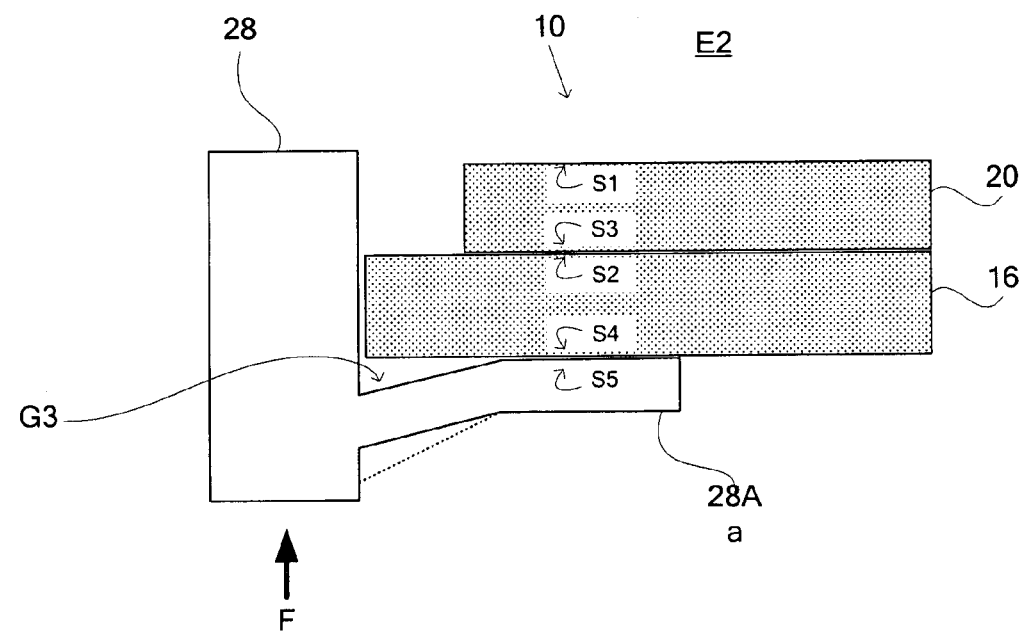
FIG. 10 is a grossly enlarged sectional view showing a left end of a still another embodiment.

However, even if the thickness of the supporting member is constant, or if the thickness of the supporting member is contrarily increased at the side of the non-face-to-face area, by tilting the supporting member, a clearance can be ensured. Such an example is shown in FIG. 10.

Briefly, if by providing a notch or a protrusion on the supporting member, or tilting the supporting member, a distance between two surfaces which face with each other (the bottom surface S4 of the glass substrate and the top surface S5 of the supporting member, for example) is relatively increased at the non-face-to-face area side in comparison with the face-to-face area side, a clearance is ensured to thereby reduce the possibility of the damage.

It should be noted that sizes, shapes, materials, arrangements, etc. of the respective components listed above are one example, and changed as required.

Although the liquid crystal display 10 is explained above, the invention can be applied to any display devices (organic EL display, and so on, for example) having two sheets of glass substrates laminated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display device, comprising:
a first glass substrate;
a second glass substrate having a first surface as one main surface a part of which faces a second surface as one main surface of said first glass substrate; and
a first supporting member having a fourth surface facing a third surface as other main surface of said second glass substrate, wherein
a distance between said third surface and said fourth surface is relatively increased at a non-face-to-face area side where said first surface does not face said second surface in comparison with at a face-to-face area side where said first surface faces said second surface.

2. A display device according to claim 1, wherein
a first concave portion is formed at an end of said fourth surface on said non-face-to-face area side.

3. A display device according to claim 1, wherein
said first supporting member further includes a fifth surface having a front and rear relationship with said fourth surface, and further comprising
a second supporting member having a sixth surface facing said fifth surface, wherein
a distance between said fifth surface and said sixth surface is relatively increase at said non-face-to-face area side in comparison with at said face-to-face area side.

4. A display device according to claim 3, wherein
a second concave portion is formed at an end of said fifth surface on said non-face-to-face area side.

5. A display device according to claim 3, wherein
a third concave portion is formed at an end of said sixth surface on said non-face-to-face area side.

6. A display device, comprising:
a first glass substrate;
a second glass substrate having a first surface as one main surface a part of which faces a second surface as one main surface of said first glass substrate;
a first supporting member having a fourth surface facing a third surface as other main surface of said second glass substrate and having a fifth surface having a front and rear relationship with said fourth surface; and
a second supporting member having a sixth surface facing said fifth surface, wherein
a distance between said fifth surface and said sixth surface is relatively increased at a non-face-to-face area side where said first surface does not face said second surface in comparison with at a face-to-face area side where said first surface is faces said second surface.

7. A display device according to claim 6, wherein
a first concave portion is formed at an end of said fifth surface on said non-face-to-face area side.

8. A display device according to claim 6, wherein a second concave portion is formed at an end of said sixth surface on said non-face-to-face area side.

* * * * *